C. McBurney,
Hose
No. 27,819. Patented Apr. 10, 1860.
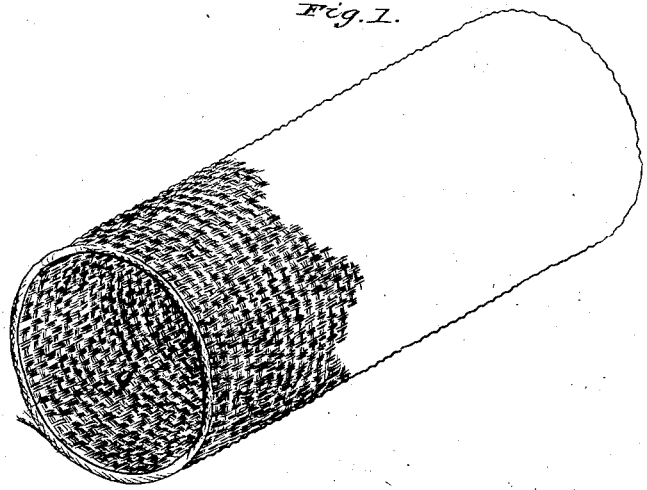
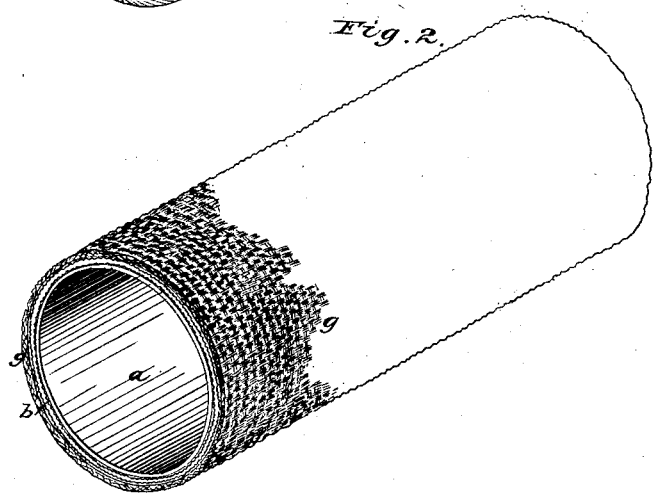
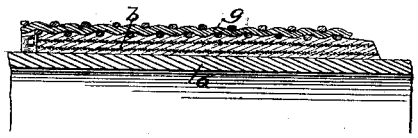
Witnesses:
Thos. R. Roach
P. E. Teschemacher
Inventor:
Chas. W. Burney.

UNITED STATES PATENT OFFICE.

CHARLES McBURNEY, OF ROXBURY, MASSACHUSETTS.

HOSE-TUBING.

Specification of Letters Patent No. 27,819, dated April 10, 1860.

*To all whom it may concern:*

Be it known that I, CHAS. McBURNEY, of Roxbury, in the county of Norfolk and State of Massachusetts, have invented an Improved Hose for Fire-Engines and other Similar Purposes, of which the following is a full, clear, and exact description, reference being had to the accompanying drawings, making part of this specification, in which—

Figure 1, is a view of the woven tube which I employ in the manufacture of the hose; Fig. 2, a view of the hose complete; Fig. 3, is a section through a portion of the hose enlarged.

Hose for fire engines and similar purposes has been made of a multiply fabric woven in strips of suitable width and coated with india rubber, the strips of coated fabric being bent into the form of hose and secured by rivets. Such hose is however heavy and not pliable the riveted joint rendering it stiff, while the fact of the material of which it is made having been woven flat, throws the most of the strain upon the center layers and very much weakens the hose. I am also aware that a closely woven cotton or linen tube has been employed as a hose. But such hose though it may be made of ample strength, will not sustain a great pressure as the liquid under such circumstances is forced through the pores of the tube; considerable time is required to dry the hose after being used, which renders it liable to mildew and decay. The hose made of successive layers of india rubber cloth is also to some extent objectionable on account of the destructive effect upon the cloth of the sulfur employed in the preparation of the gum.

To avoid all these inconveniences and to produce a hose that shall have the requisite strength and flexibility, and at the same time shall be easily dried after use and not liable to speedy decay is the object of my present improvement which consists in a hose made of fibrous material woven in the form of a tube and lined with india rubber the sulfured rubber being prevented from coming in contact with the fibrous material by an interposed layer of unsulfured rubber as will now be more particularly described.

Fig. 1, represents a tube which is woven in the well known manner of making fibrous tubes, and may be of cotton, hemp, flax or other suitable fibrous material, and of the thickness required to give the necessary strength. A tube of vulcanized rubber (*a* Figs. 2 and 3,) is then prepared and placed upon a round iron bar or rod—outside of this tube is wound one, two or more thicknesses (*b*, Figs. 2, and 3) of cloth coated on both sides with unsulfured rubber, this last is then covered with india rubber cement prepared without sulfur and the fibrous tube (*g* Figs. 1, 2, and 3) the inside of which is also covered with cement, is drawn over it. This latter part of the operation may be performed by hand or by suitable nippers operated by machinery. The iron bar is now withdrawn and a larger bar is inserted by which the interior tube is distended and the unsulfured coating is pressed closely against the interior of the woven hose. The latter is then caused to bind still more closely against the india rubber interior by wrapping with canvas bands, cords, wire, or otherwise and the whole is heated to a temperature of 200° to 250° Fahrenheit, or thereabout to complete the union of the materials and dry the cement employed. In lieu of placing the hose upon the iron bar and exposing it to the heat of an oven as in the process of vulcanizing, the requisite heat may be applied to dry the cement by admitting steam under pressure directly to the interior of the hose or by forcing in boiling water the pressure in either case serving to bring the materials into close contact and the heat operating to dry the cement.

A hose is thus produced having the requisite strength to resist any required pressure and which at the same time is perfectly water proof while the fibrous material is protected from the rotting effect to which it is exposed when brought into direct contact with the sulfured rubber.

I have thus described one method which I have adopted with success of making my improved hose, but I do not confine myself to these details which may be varied without altering the principle of my invention. Neither do I limit myself to any particular temperature under which the final operation is completed and the cement dried as this may be varied to a considerable extent without materially altering the result.

What I claim as my invention and desire to secure by Letters Patent is—

A hose for conveying liquids, having a fibrous woven exterior and a vulcanized india rubber interior, with an interposed layer of unsulfured rubber as set forth for the purpose specified.

CHAS. McBURNEY.

Witnesses:
   THOS. R. ROACH,
   P. E. TESCHEMACHER.